Patented Sept. 11, 1951

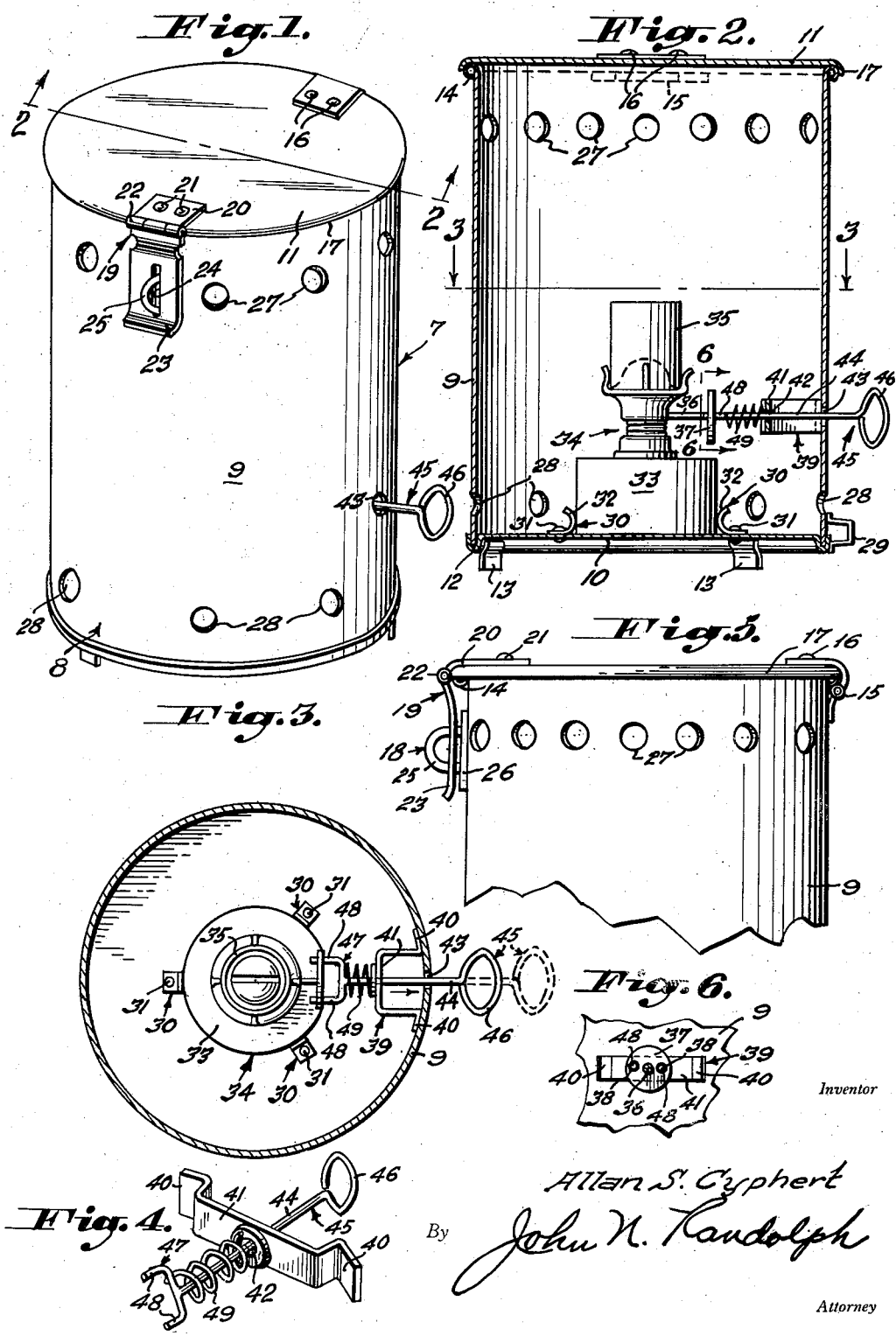

2,567,323

UNITED STATES PATENT OFFICE 2,567,323

HEATED SEAT FOR SPORTSMEN

Allan S. Cyphert, Saltsburg, Pa.

Application April 29, 1949, Serial No. 90,498

2 Claims. (Cl. 126—96)

This invention relates to a heater adapted to be utilized as a seat for sportsmen, particularly hunters while on watch for game in cold weather or which may be utilized by others, out of doors, as for example for winter fishing through ice and where it is dangerous or impractical to build a fire.

The primary object of the present invention is to provide a heater of extremely simple construction on which a person may sit, out of doors, and be maintained much warmer than would be possible with a fire and which will eliminate the danger and inconvenience in going for wood to maintain an outdoor fire and which eliminates the need of a hunter moving and possibly frightening away game.

A further object of the invention is to provide a heated seat of extremely simple construction having a very small fuel consumption and which will burn for many hours on as little as a pint of liquid fuel.

A further and primary object of the present invention is to provide a heater with which a conventional type of kerosene or similar fuel burner may be utilized and having means for regulating the burner wick from a position externally of the heater casing so that it is not necessary to open the heater and reach into the hot interior thereof in order to adjust the size of the flame.

Still a further and important object of the invention is to provide an external regulating means for the burner having the additional function of assisting in maintaining the burner detachably in a predetermined position within the heater casing.

Various other objects and advantages of the invention will hereinafter become more fully apparent from the following description of the drawing, illustrating a presently preferred embodiment thereof, and wherein:

Figure 1 is a perspective view of the heater;

Figure 2 is a substantially central vertical sectional view, partly in side elevation thereof, taken substantially along a plane as indicated by the line 2—2 of Figure 1;

Figure 3 is a horizontal sectional view of the heater taken substantially along a plane as indicated by the line 3—3 of Figure 2;

Figure 4 is a perspective view showing the burner actuating means detached from the heater;

Figure 5 is a fragmentary side elevational view of the upper portion of the heater, and Figure 6 is a vertical sectional view taken substantially along a plane as indicated by the line 6—6 of Figure 2.

Referring more specifically to the drawing, the novel heated seat in its entirety and which comprises the invention is designated generally 7 and includes a heater casing 8 which is preferably provided with a cylindrical side wall 9, a bottom 10 and a top 11; however, said side wall 9 may be of any other desired cross sectional shape. As seen in Figure 2, the bottom 10 is provided with a downwardly offset peripheral portion defining an endless upwardly opening groove 12 for receiving the bottom edge of the side wall 9 and in which said bottom edge may be clamped or otherwise suitably and permanently secured. The bottom 10 is also provided with short depending legs 13, adapted to rest on a suitable supporting surface, not shown, for supporting the heater or heated seat 7 in an upright position. The side wall 9 is provided with a rolled top edge 14 and the top wall 11 is swingably supported relatively to the upper end of the cylindrical side wall 9 by a leaf hinge 15 one leaf of which is secured by rivets 16 to the upper side of the top 11 and the other leaf of which is similarly secured to the outer side of a portion of the wall 9. The top 11 thus forms a hinge cover which may be swung upwardly and outwardly to expose the upper end of the heater casing 8 as defined by the rolled edge 14 and said cover 11 is provided with a downwardly rolled edge 17 which engages over a portion of the rolled edge 14, when the cover 11 is in a closed position, as best illustrated in Figure 2.

The cover 11 is adapted to be detachably latched in a closed position by a latch, designated generally 18 including a hasp, designated generally 19, composed of a stationary hasp leaf 20 which is riveted or otherwise secured as seen at 21 to the upper surface of the top 11 in substantially diametrically opposed relationship to the hinge 15 and which extends outwardly over the rolled edge 17 and is hingedly connected at 22 to the other hasp leaf 23 which normally depends downwardly from the leaf 20 and which is provided with a longitudinally elongated opening 24 for receiving a staple 25, forming the other part of the latch means 18. The staple 25 is mounted by its base 26 on the outer side of a portion of the side wall 9 to which said base 26 may be secured in any suitable manner as by means of rivets, not shown, and with the staple 25 positioned with its plane disposed longitudinally thereof. It will be readily apparent that the hasp leaf 23 may be swung outwardly and upwardly for disengaging it from the staple 25 to permit the cover 11 to be swung upwardly and to the right on the hinge 15, as seen in Figure 5, to an open position.

The side wall 9 adjacent its upper rolled edge 14 is provided with a series of circumferentially spaced vent openings 27 and said side wall 9 is provided, near the bottom 10 with another series of circumferentially spaced vent openings 28. The heater casing 8 is provided adjacent its bottom with a loop 29 by which the heater or heated seat 7 may be attached by snap fastener, not shown, to the belt or other part of the wearing apparel of a sportsman for carrying the heater, when not in use.

The casing bottom 10, on its upper, inner side is provided with at least three spring retaining clips 30 each of which is fastened to the bottom 10 adjacent an end thereof by a rivet or similar fastening 31 and each of which has an inner upwardly extending and outwardly turned free end portion 32, which portions 32 are adapted to resiliently engage the annular wall of a reservoir 33 of a liquid fuel burner, designated generally 34, preferably of the type which burns kerosene, the bottom of which reservoir 33 rests on the upper side of the casing bottom 10 and is detachably retained in applied position by the spring clip portions 32. The liquid fuel burner 34 is of the wick type and is provided with a flue or chimney 35 which is preferably formed of metal for surrounding the wick thereof, not shown, and which is preferably approximately three inches in height. The burner 34 is provided with a laterally projecting stem 36 on the outer end of which is secured a disk 37 and which stem 36 is adapted to be turned for raising or lowering the burner wick, in a conventional manner. The disk 37 is provided with two spaced openings 38.

A bracket, designated generally 39 is disposed within the casing 8 and is provided with outturned end portions 40 which are suitably secured to portions of the inner side of the casing wall 9 and an inwardly offset intermediate portion 41 having a flanged opening 42 which is adapted to be disposed in radial alignment with an opening 43 of the wall 9 to slidably and turnably receive the elongated shank 44 of a wick actuating key, designated generally 45 having a handle portion 46 at its outer end and disposed externally of the casing 8 and provided at its inner end with a bifurcated head 47 having laterally spaced substantially parallel tines or furcations 48 which reciprocally engage in the openings 38 of the disk 37. An expansion coiled spring 49 is carried by the shank 44 and has one end thereof engaging the head 47 and its opposite end bearing against the flange surrounding the opening 42 for yieldably urging the turning key 45 inwardly of the casing 8 for releasably retaining the tines 48 in engagement with the disk openings 38. It will thus be readily apparent that the key handle 46 is to be revolved for turning the key 45 in either direction to cause the stem 36 to be turned in unison with the key for either raising or lowering the wick of the burner 34 to vary the size of the burner flame and the heat produced by the burner or heated seat 7 and that such adjustment can be accomplished without the necessity of reaching into the burner casing 8 or opening the cover 11. It will also be readily apparent that the key 45 will additionally function in combination with the spring clips 30 for retaining the burner 34 correctly positioned in the casing 8 and that the key 45 can be retracted against the action of its spring 49 to disengage its tines 48 from the disk 37 while removing the burner 34 from the casing 8 or while applying it thereto.

From the foregoing detailed description of the construction and operation of the heated seat or burner 7, it will be readily apparent that a portable burner of extremely simple construction has been provided which will be relatively light in weight so that it can be conveniently carried and on which a sportsman may conveniently sit, after preferably applying a short board or disk of wood or other material to the top 11 and by allowing his coat or outer garment to hang down so as to be disposed substantially around the burner 7, the heat therefrom will pass upwardly within such outer garment to afford maximum utilization thereof to maintain the user in a warm and comfortable condition. The lower ring of openings 28 are provided to admit air to the burner 34 and the upper ring of openings 27 are provided for the release of the hot air and products of combustion from the casing 8.

Obviously, the heated seat or heater 7 may be constructed in various sizes, as for example, the casing 8 may be approximately ten inches in diameter and approximately fourteen or fifteen inches in height and with the burner 34 of the proportionate size as illustrated in Figures 2 and 3 and having a reservoir 33 of approximately a one pint capacity. With the low flame which is required to maintain a comfortable heat, a one pint capacity fuel reservoir has been found sufficient to maintain the heater 7 in operation for approximately twelve hours.

Various modifications and changes are contemplated and may obviously be resorted to, without departing from the spirit or scope of the invention as hereinafter defined by the appended claims.

I claim as my invention:

1. A heated seat for sportsmen comprising a heater casing adapted to rest on a supporting surface and having a top forming a seat which is hingedly mounted for swinging movement to an open position to expose the interior of the casing, said casing having a side wall provided with inlet and outlet openings, a wick-type liquid fuel burner of a cross sectional size substantially less than that of the casing demountably disposed within said casing and supported on the casing bottom, a plurality of spring clips secured to the upper, inner side of the casing bottom and yieldably engaging a part of the fuel burner for detachably retaining the burner in an upright position centrally within the casing and in engagement with the casing bottom, and a manually actuated wick adjusting means operable from a position externally of the casing for raising and lowering the burner wick, said burner having a wick actuating stem, a disk fixed to the stem and provided with diametrically spaced openings, said manually actuated wick adjusting means including a bifurcated end portion having tines detachably engaging the disk openings and a spring releasably retaining said tines in engagement with the disk openings, said disk, tines and spring cooperating with said spring clips for detachably retaining the burner in an applied position within the casing and centrally thereof.

2. A heated seat for sportsmen comprising a heater casing adapted to rest on a supporting surface and having a top forming a seat which is hingedly mounted for swinging movement to an open position to expose the interior of the casing, said casing having a side wall provided with inlet and outlet openings, a wick-type liquid fuel burner of a cross sectional size substantially less than that of the casing demountably disposed within said casing and supported on the casing bottom, a plurality of spring clips secured to the upper, inner side of the casing bottom and yieldably engaging a part of the fuel burner for detachably retaining the burner in an upright position centrally within the casing and in engagement with the casing bottom, and a manually actuated wick adjusting means operable from a position externally of the casing for raising and lowering the burner wick, said burner having a radially projecting rotatably mounted wick actuating stem, a disk fixed to the outer end of said stem and provided with diametrically spaced openings, said manually actuated wick adjusting means including an elongated shank extending radially through the side wall of the casing and reciprocally and rotatably disposed therein, a handle on the outer end of said shank adapted to be manually engaged for turning the adjusting means and for retracting it away from the wick actuating stem and disk, said shank having a bifurcated inner end including spaced substantially parallel tines detachably engaging the openings of said disk for turnably connecting the wick adjusting means and stem, and an expansion spring carried by said shank and bearing against the bifurcated head and biasing said head toward the disk.

ALLAN S. CYPHERT.

REFERENCES CITED

The following references are of record in the file of this patent:

UNITED STATES PATENTS

| Number | Name | Date |
|---|---|---|
| 208,251 | Mains | Sept. 24, 1878 |
| 237,346 | Walter | Feb. 1, 1881 |
| 1,247,518 | Everett | Nov. 20, 1917 |